United States Patent Office 2,789,130
Patented Apr. 16, 1957

2,789,130

INTERMEDIATES AND PREPARATION OF 6 - METHYL - 9 - CYCLOHEXYLIDENE - 5 - NONEN-2-ONE

Walter Kimel, Highland Park, N. J., assignor to Hoffmann-La Roche Inc., Nutley, N. J., a corporation of New Jersey No Drawing. Application August 24, 1955,
Serial No. 530,413

4 Claims. (Cl. 260—483)

This invention relates to a novel process for the preparation of 6 - methyl-9-cyclohexylidene-5-nonen-2-one. The latter is a compound which has not hitherto been described in any printed publication. 6-methyl-9-cyclohexylidene-5-nonen-2-one is useful as an odor-imparting agent, e. g. in the preparation of perfumes and of scented compositions generally. The compound possesses a characteristic fragrance reminiscent of roses, with a fruity note, and can be incorporated in perfumes and the like in which it is desired to employ said characteristic fragrance as a component of the odor.

In a comprehensive embodiment, the invention provides a process for the preparation of 6-methyl-9-cyclohexylidene-5-nonen-2-one which comprises condensing 3-methyl-6-cyclohexylidene-1-hexen-3-ol with diketene and eliminating carbon dioxide from the condensation product. A preferred mode of execution comprises condensing 3-methyl-6-cyclohexylidene-1-hexen-3-ol with diketene in the presence of a condensation catalyst, e. g. an inorganic or organic acid, such as sulfuric acid or benzenesulfonic acid, or an acid reacting salt of such acids, such as sodium bisulfate, or an organic base having a tertiary nitrogen atom, such as triethylamine or picoline, or a salt having an alkaline reaction in aqueous solution such as sodium sulfite; and preferably in the presence of an inert organic solvent, e. g. an aliphatic hydrocarbon, such as petroleum ether, or an aromatic hydrocarbon, such as benzene or toluene; and heating the condensation product obtained, 3-methyl-6-cyclohexylidene-1-hexen-3-yl acetoacetate, to a temperature sufficiently high to eliminate carbon dioxide from said condensation product, i. e. a temperature above about 140° C., thereby forming 6-methyl-9-cyclohexylidene-5-nonen-2-one.

The starting material employed, 3-methyl-6-cyclohexylidene-1-hexen-3-ol, is itself a novel compound not hitherto described in a printed publication. Said compound and its preparation are not claimed herein, but are reproduced below in order that the instant disclosure may be complete:

Preparation of 3-methyl-6-cyclohexylidene-1-hexen-3-ol 445 g. of 1-vinyl-cyclohexanol was stirred for one hour with 1500 cc. of concentrated (37%) aqueous hydrochloric acid. The oil was separated, washed twice with water, and dried over calcium chloride. The 2-cyclohexylideneethyl chloride obtained had $n_D^{25} = 1.4994$.

In a five-liter flask, there was placed 390 g. of ethyl acetoacetate, 157 g. of sodium methylate and two liters of benzene. 414 g. of 2-cyclohexylideneethyl chloride was added at 40° C. in 30 minutes while stirring vigorously. The reaction mixture was stirred for three hours at 60–70° C., then for two hours at reflux temperature. After cooling, the reaction mixture was washed twice, each time with two liters of water. The benzene was distilled off under vacuum. The residual light brown colored syrup was dissolved in two liters of ethyl alcohol. This was placed in a flask together with 200 g. of potassium hydroxide and 500 cc. of water. The saponification was accomplished by stirring at 40–50° C. for four hours. Concentrated hydrochloric acid was dropped in from a separatory funnel, at such a rate that evolution of carbon dioxide did not cause foaming, until the mixture became strongly acid. The oil layer was removed. The aqueous layer was diluted with two liters of water and extracted with 500 cc. of benzene. The benzene extract and the oil layer were combined, washed neutral and dried over calcium chloride. On fractionation, there was obtained 5-cyclohexylidene-2-pentanone, distilling at 103° C./6 mm., $n_D^{25} = 1.4760$.

26 g. of metallic sodium was dissolved in one liter of liquid ammonia. Acetylene was bubbled into the solution, while stirring, until the color of the solution changed from deep blue to white. 159 g. of 5-cyclohexylidene-2-pentanone in 200 cc. of diethyl ether was dropped into the stirred reaction mixture in one hour. Stirring was continued for three more hours while a slow stream of acetylene was bubbled in. The acetylene addition was stopped and the stirring was continued for 15 hours longer. The ammonia was then distilled off and the residue was washed with 2 liters of 5% aqueous sulfuric acid. The product was water washed, and dried over calcium sulfate. Upon fractionation, there was obtained 3-methyl-6-cyclohexylidene-1-hexyn-3-ol, distilling at 75° C./0.2 mm., $n_D^{25} = 1.4920$.

117 g. (0.6 mol) of 3-methyl-6-cyclohexylidene-1-hexyn-3-ol, 20 g. of 5% lead-palladium-calcium carbonate catalyst [Lindlar, Helvetica Chimica Acta 35, 446 (1952)] and 100 cc. of petroleum ether were placed in a flask equipped with an efficient stirrer. The material was hydrogenated at one atmosphere hydrogen pressure and 25–30° C. until hydrogen uptake ceased. There was required 0.6 mol of hydrogen. The catalyst was filtered off, and the product was fractionated. There was obtained 3 - methyl - 6 - cyclohexylidene-1-hexen-3-ol, distilling at 73° C./0.2 mm., $n_D^{25} = 1.4908$.

The invention is further disclosed in the following example, which is illustrative but not limitative thereof:

Example

A solution of 68.1 g. (0.35 mol) of 3-methyl-6-cyclohexylidene-1-hexen-3-ol in an equal volume of petroleum ether was placed in a 1-liter, 3-neck flask provided with a mechanical stirrer, dropping funnel and thermometer. To the solution was added 1 cc. of pyridine and 1 cc. of acetic acid. Then, from the dropping funnel, 32.4 g. of diketene was added, dropwise, over a period of one hour, while maintaining a reaction temperature of 25–30° C. by external cooling. Stirring was continued until there was no further heat evolution from the reaction mixture. Then the solution was washed several times each with dilute sulfuric acid, aqueous sodium bicarbonate, and finally to neutrality with water. The organic portion was dried with sodium sulfate, and the solvent was removed in vacuo. The product, 3-methyl-6-cyclohexylidene-1-hexen-3-yl acetoacetate, was obtained in 96.4 g. yield (99% of theory); $n_D^{25} = 1.4842$.

Decarboxylation of the acetoacetate was conducted in a 1-liter, 3-neck flask equipped with a stirrer, thermometer and reflux condenser, the top of which was connected to a solid carbon dioxide trap, and then to a gas meter. The ester was heated to 150–175° C., causing a rapid evolution of carbon dioxide, which terminated after about 90 minutes. The product was then purified by fractional distillation at reduced pressure. The desired ketone, 6-methyl-9-cyclohexylidene-5-nonen-2-one, was obtained at 108–110° C. (0.15 mm.); $n_D^{25} = 1.4888$; yield, 57.5 g. (70% of theory).

I claim:

1. A process which comprises heating 3-methyl-6-cyclohexylidene-1-hexen-3-yl acetoacetate to a temperature sufficiently high to eliminate carbon dioxide therefrom thereby forming 6-methyl-9-cyclohexylidene-5-nonen-2-one.

2. 3-methyl-6-cyclohexylidene-1-hexen-3-yl acetoacetate.

3. A process of making 3-methyl-6-cyclohexylidene-1-hexen-3-yl acetoacetate which comprises condensing 3-methyl-6-cyclohexylidene-1-hexen-3-ol with diketene in the presence of a condensation catalyst.

4. A process for the preparation of 6-methyl-9-cyclohexylidene-5-nonen-2-one which comprises condensing 3-methyl-6-cyclohexylidene-1-hexen-3-ol with diketene and decarboxylating the condensation product.

References Cited in the file of this patent
UNITED STATES PATENTS
Kimel et al.: J. Am. Chem. Soc. 65, pp. 1992–8.
Lacey: J. Chem. Soc. (London), 1954, pp. 827–32.